United States Patent [19]

Rossi

[11] Patent Number: 4,572,017

[45] Date of Patent: Feb. 25, 1986

[54] VARIABLE SPEED DRIVE FOR FILLING CUBICLE CONTAINER

[75] Inventor: Cristiano Rossi, Birmingham, Mich.

[73] Assignee: Robogate Systems Inc., Mich.

[21] Appl. No.: 502,328

[22] Filed: Jun. 8, 1983

[51] Int. Cl.[4] ............................................. F16H 35/02
[52] U.S. Cl. ........................................ 74/394; 74/63;
 108/21; 108/22; 248/131
[58] Field of Search .................... 74/63, 394; 248/131;
 108/20, 21, 22

[56] References Cited

U.S. PATENT DOCUMENTS

| | | | |
|---|---|---|---|
| 3,204,330 | 9/1965 | Pomernacki | 74/394 |
| 3,459,312 | 8/1969 | Britcher, Jr. et al. | 248/131 |
| 3,730,014 | 12/1973 | Brems | 74/394 |
| 4,216,727 | 8/1980 | Cunningham | 108/20 |

Primary Examiner—Ronald C. Capossela

[57] ABSTRACT

A system for substantially filling a cubicle container including its corners with frangible material discharged from a fixed offcenter hopper outlet including means for rotating the container under the outlet at a variable rate, relatively slower during corner passage and relatively faster during side passage.

15 Claims, 4 Drawing Figures

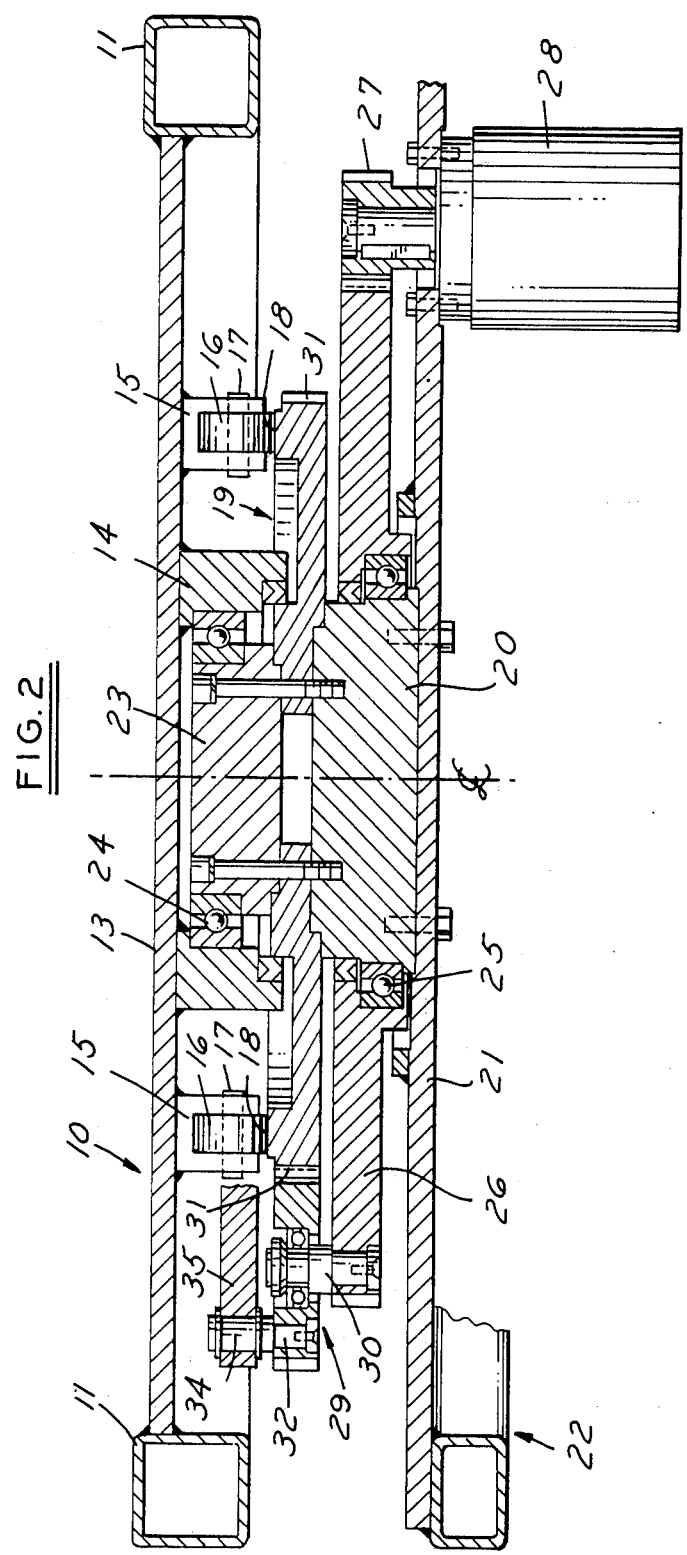

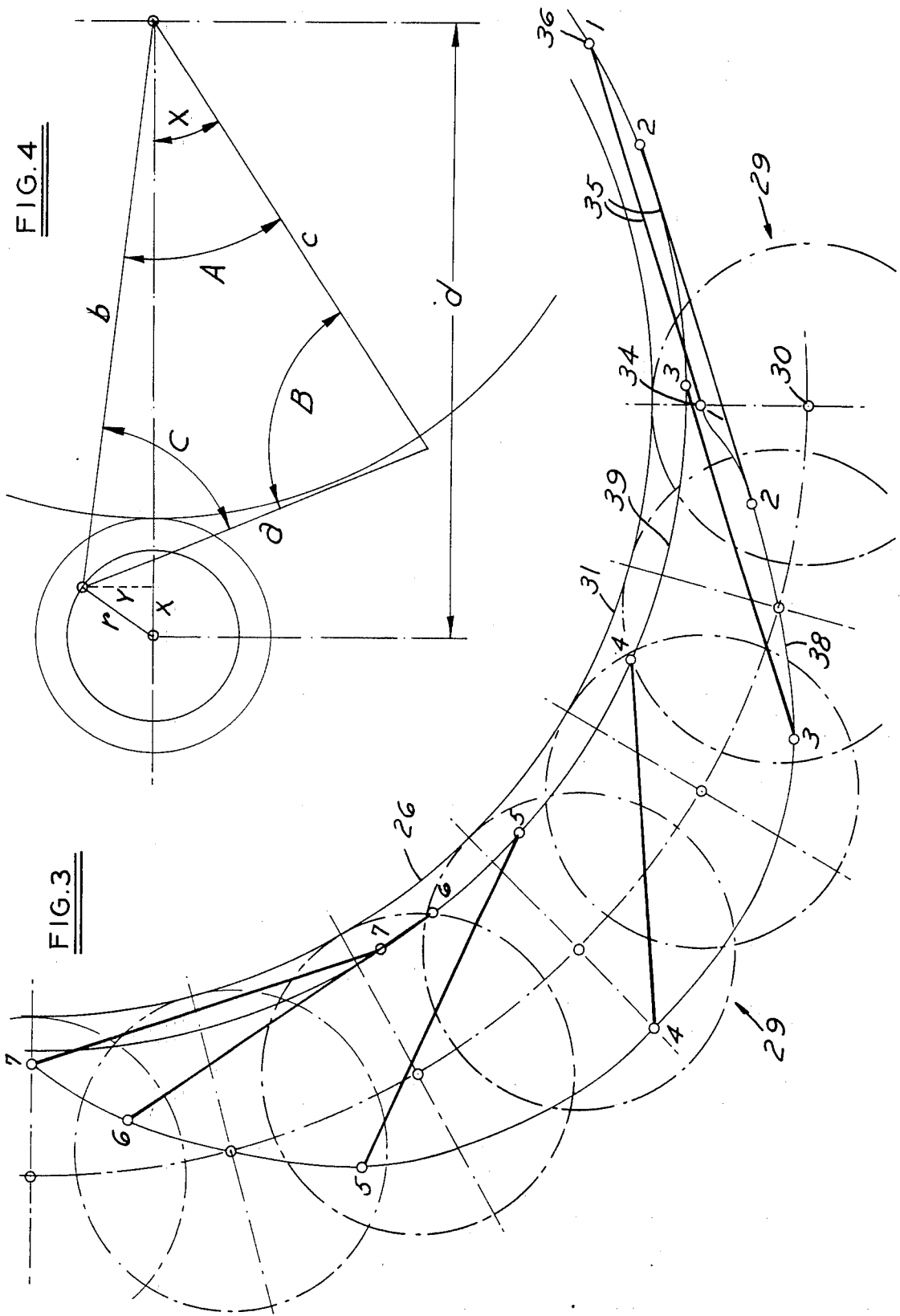

VARIABLE SPEED DRIVE FOR FILLING CUBICLE CONTAINER

BACKGROUND OF THE INVENTION

In the handling and storage of materials, particularly frangible food materials such as corn flakes susceptible to undesirable breakage from impact or agitation, serious problems arise during various steps of the processing where bulk handling and storage is required.

A case in point is the requirement for temporary storage in large cubicle containers which are stacked in storage areas, the containers having a cubicle configuration for conservation of space. In filling such containers from fixed discharge hoppers the corn flakes or like material flowing at a uniform rate from the hopper tends to form a conical pile having a slope angle based on the flow characteristics of the particular material. In order to provide more effective distribution than would result from central discharge into a stationary container, prior means have been provided for rotating the container in offcenter relation during discharge thereby forming a conical ridge spread over a wider area of the container than would result from central filling.

In order to minimize drop distance of the material, provision has also been made to lower the container during rotational filling so that the drop never exceeds approximately six inches; however, even with such provisions the uniform flow of material down the slopes of the conical ridge has left the four corners of the container inadequately filled. Since manual redistribution of the material either during or subsequent to filling is undesirable from both a breakage and labor standpoint a need for improvement in the filling system has persisted.

BRIEF DESCRIPTION OF THE PRESENT INVENTION

The present improvement provides means for cyclical variation in the rate of rotation for each quadrant of container rotation in order to provide proportionately slower rotation with greater discharge while the container corners are in the proximity of the hopper. The result of this approach is a relatively higher buildup of the ridge along the corner diagonals causing a more effective collapsing flow of the material into the corners with a net substantial improvement in the volumetric ratio of filling within the confines of the top perimeter of the container.

In a typical warehouse 1,000 containers of a five foot cube dimension may be employed to store corn flakes or like food materials so that efficiency is maximizing filling with no manual or secondary redistribution has important space saving implications. A typical discharge hopper may have a one foot diameter opening the center of which is located at ¼ of the diagonal dimension from the center of the container. The variable speed of rotation is accomplished through an epicyclic gear train with linkage adaptable to produce a desired ratio of speed variation adjustable to produce optimum results in terms of equalized distribution of frangible material for maximum volumetric efficiency without resort to manual or supplemental redistribution.

BRIEF DESCRIPTION OF THE DRAWINGS

FIG. 2 is an enlarged sectional view taken along the line 2—2 of FIG. 1;

FIG. 3 is a schematic plan view of the progression in position of the various epicyclic linkage pivots for one quadrant revolution of the table;

FIG. 4 is a schematic plan view illustrating the geometric vector angular relationship of the drive pivot linkage elements;

With reference to FIG. 1 the rotary table comprises rectangular tabletop frame 10 having square tubular side rails 11 providing an uppermost table surface, angular cross braces 12 welded to tubes 11, flat plate 13 extending between and welded to elements 11 and 12, depending cylindrical bearing collar 14 for roller brackets 15 welded to the underside of plate 13, each carrying roller 16 rotatable on axle shaft 17.

Figure 1:
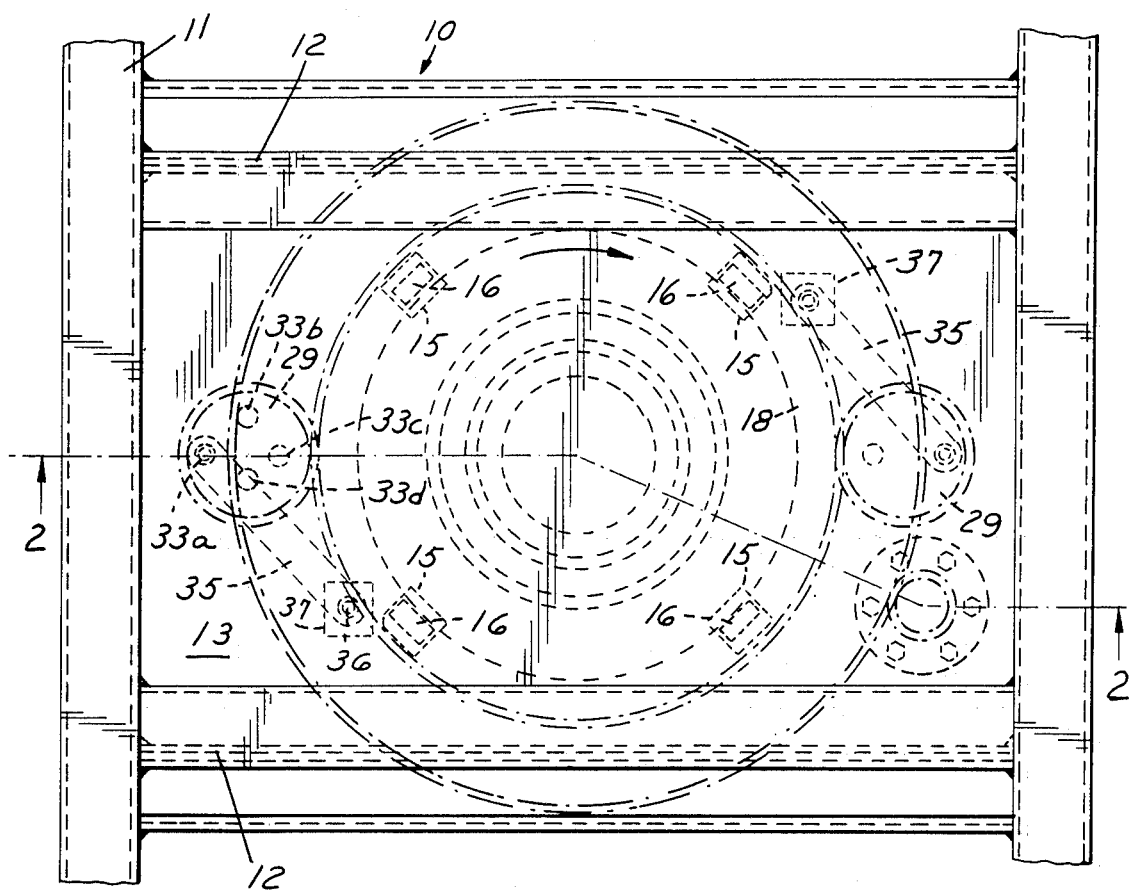
FIG. 1 is a plan view of the rotatable table on which the cubicle container (not shown) is mounted for filling.

Rollers 17 run on stationary circular track 18 formed on the upper surface of horizontal annular gear 19 mounted on central annular support 20 bolted to the top of stationary plate 21 welded to the top of stationary frame members 22. Upper annular support 23 bolted through gear 19 to annular support 20 serves to mount radial anti-friction bearing 24 serving as the hub for the rotation of table 10. Annular support 20 and anti-friction bearing 25 serve as the hub for rotatable gear 26 driven at constant speed by pinion 27 on the output shaft of electric motor 28 mounted on the bottom of stationary plate 21. Planetary gears 29 mounted on spindles 30 extending upwardly from the outer perimeter of gear 26 engage stationary teeth 31 at the outer perimeter of gear 19 causing gears 29 to rotate as planets at a constant speed through the drive of gear 26.

Eccentric pin 32, adjustably mounted in any of a plurality of holes 33a, b, c or d spaced at different radial dimensions from the center of gear 29, serves as pivotal connection at 34 for link 35 extending to pivot 36 secured by mounting block 37 to the underside of rotatable table plate 13. Through such linkage the eccentric motion of connection 34 about the center of gear 29 traveling at a constant speed will serve to add and subtract a component of eccentric pivot speed to table drive connection 36 proportional to the extent of eccentricity determined by the radial distance of the effective connection point at 33a, b, c or d, the latter providing the least variation in speed and outermost connection 33a providing the greatest. In order to achieve a single cycle of table speed variation in each quadrant of travel, gear 29 is provided with one fourth the pitch diameter and number of teeth as gear 19.

From an examination of FIG. 1, it will be apparent that with the epicyclic linkage disclosed, the component of speed differential incident to eccentric travel of connection at 33a will be zero when the center line of link 35 extends across the center of gear 29. Assuming clockwise rotation of the table, preferred to place drive link 35 under tension, table rotary velocity variation will be negative when link 35 center line is inside of gear 29 center with maximum reduction when connection 33a, gear 29 center and connection 37 are at a right angle relation, and wil be positive with velocity being added when link 35 center line is outside of gear 29 center, again with maximum added velocity component when connection 33a, gear 29 center and connection 37 are at right angle relationship. Accordingly, in order for the table speed to be slowest when the center of the discharge hopper is on a diagonal between corners, the hopper should be so located relative to the position of connection 33 when in an inside right angle relation to gear 29 center.

It will be understood that in accordance with prior practice, cubical containers with means for automatic lowering as filling progresses to minimize material free fall will be placed on the rotary table in an offcenter relation below a fixed discharge hopper, so that the improvement of the present invention may be effective in providing variable speed rotation to more evenly fill the corners of the container.

With reference to FIG. 3 the progression of planet gear 29 through six equal increments of rotary movement in a single quadrant is laid out with the position of each pivotal connection 30, 34 and 36 shown for each increment of movement. Thus, the center pivot 30 of gear 29 is shown at seven successive positions of equal circumferential increment while eccentric pivot 34 is likewise shown at seven progressive increments along its epicyclic curved path 38; and the resulting unequal increments of pivotal connection 36 is likewise shown at seven successive points on its circular path 39.

The significant velocity of the table at any given position relative to the discharge of material will be the velocity of pivotal connection 36 with the tabletop along its circular path. The influence of eccentric connection 33 through link 35 in imparting a superimposed crank action as gear 29 rotates about stationary gear 26 may be understood from the vector diagram illustrated in FIG. 4 as applied to the eccentric pivot 34 in FIG. 3.

Thus, gear 29 and driving pivot 34 will make one revolution in traversing 90° around stationary gear 26 during which the angle X will change in accordance with the following formulae:

Letting the center 30 of planet gear 29 represent O for the x, y coordinates of pivot 34, $$b = \sqrt{(d-x)^2 + y^2}$$

$$y/b = \sin Y$$

$$\cos A = \frac{b^2 + c_2 - a^2}{2bc}$$

$$X = A - (\text{or} +) Y.$$

The change in angle X during rotation of gear 29 will be proportional to the change in table velocity and the range of change will be proportional to the eccentric radius r.

Typical values where the dimensions in the diagram are a=200; d=320; c=268, and where the radius r of eccentric pivot 34 is the listed % of the radius of the planet gear 29, are as follows:

| r % of Planet | Min/Max Table Velocity |
| --- | --- |
| 30% | 55.4% |
| 40% | 44.3% |
| 50% | 34.6% |

It will be understood that changes in length of link 35 and location of pivot 36 relative to the radius of gear 26 will also affect the cyclical values resulting from the epicyclic gear train disclosed and may be tailored to provide a desired curve of intermediate rates of table rotation as well as minimum/maximum ratio.

I claim:

1. A rotatable table support for filling cubicle containers with frangible materials from a fixed offcenter discharge hopper, characterized by a fixed base, a horizontal rotatable tabletop pivotally mounted on said fixed base, constant speed power means mounted on said base for rotating said tabletop, and cyclical variable speed transmission means driven by said power means and extending between said power means and tabletop, said transmission means having a repeat cycle means for each quarter revolution of said tabletop providing a like single rise and fall in tabletop rotational speed in each quadrant of its rotation.

2. The rotatable table support of claim 1 wherein said transmission means includes epicyclic transmission gearing operative to repeat a single epicycle in each quadrant of said tabletop rotation.

3. The rotatable table support of claim 2 wherein said gearing includes planetary gear means having an eccentric pivot operative as an epicyclic element.

4. The rotatable table support of claim 2 wherein said gearing includes planetary gear means having an eccentric pivot operative as an epicyclic element and a fixed sun gear mounted on said base engaged by said planetary gear means.

5. The rotatable table support of claim 2 wherein said gearing includes planetary gear means having an eccentric pivot operative as an epicyclic element, a fixed sun gear mounted on said base engaged by said planetary gear means, and carrier means for driving said planetary gear means around said fixed sun gear.

6. The rotatable table support of claim 2 wherein said gearing includes planetary gear means having an eccentric pivot operative as an epicyclic element, a fixed sun gear mounted on said base engaged by said planetary gear means, and carrier means for driving said planetary gear means around said fixed sun gear, said carrier means comprising a gear driven by said power means at constant speed.

7. The rotatable table support of claim 2 wherein said gearing includes planetary gear means having an eccentric pivot operative as an epicyclic element, a fixed sun gear mounted on said base engaged by said planetary gear means, and carrier means for driving said planetary gear means around said fixed sun gear, said carrier means comprising a gear driven by said power means at constant speed, said power means comprising an electric motor having a pinion gear on its output shaft engaging said carrier gear.

8. The rotatable table support of claim 2 wherein said gearing includes planetary gear means having an eccentric pivot operative as an epicyclic element, and linkage means connecting said eccentric pivot to said tabletop.

9. The rotatable table support of claim 2 wherein said gearing includes planetary gear means having an eccentric pivot operative as an epicyclic element, and linkage means connecting said eccentric pivot to said tabletop, said planetary gear means including means for adjusting the radial eccentric throw of said eccentric pivot.

10. The rotatable table support of claim 2 wherein said gearing includes planetary gear means having an eccentric pivot operative as an epicyclic element, and linkage means connecting said eccentric pivot to said tabletop, said linkage means comprising a drag link with a pivotal connection to said tabletop.

11. The rotatable table support of claim 2 wherein said gearing includes planetary gear means having an eccentric pivot operative as an epicyclic element, said planetary gear means including a plurality of planetary gears engaging said fixed sun gear driven by a common carrier means.

12. A rotatable table support for filling cubicle containers with frangible materials from a fixed offcenter discharge hopper, characterized by a fixed base, an annular vertical axis hub mounted on said base, a rotatable gear mounted on said hub, an electric motor mounted on said base having an output shaft with pinion gear in driving engagement with said gear, a fixed gear mounted on said hub, a secondary vertical axis hub extending above said fixed gear, a tabletop rotatably mounted on said secondary hub, said first rotatable gear comprising a carrier with spindle means for mounting at least one planet gear engaging said fixed sun gear, said planet gear having one-fourth the pitch diameter of said sun gear, eccentric pivotal drive means extending from said planet gear, a drive link having one end connected to said drive means and the other end pivotally connected to said rotary tabletop.

13. The rotatable table support of claim 12 including an annular roller track formed on the surface of said sun gear near its outer perimeter, and roller support means for said tabletop engaging said annular track.

14. The rotatable table support of claim 12 including means for adjusting the extent of eccentric throw and speed differential imparted to said tabletop.

15. The rotatable table support of claim 12 wherein a plurality of planet gears are mounted on said carrier gear for engagement with said sun gear, each having a separate pivoted linkage connection to said tabletop.

* * * * *